United States Patent
Boyle et al.

(10) Patent No.: US 8,327,077 B2
(45) Date of Patent: Dec. 4, 2012

(54) METHOD AND APPARATUS OF PARALLEL COMPUTING WITH SIMULTANEOUSLY OPERATING STREAM PREFETCHING AND LIST PREFETCHING ENGINES

(75) Inventors: Peter A. Boyle, Edinburgh (GB); Norman H. Christ, Irvington, NY (US); Alan Gara, Yorktown Heights, NY (US); Robert D. Mawhinney, New York, NY (US); Martin Ohmacht, Yorktown Heights, NY (US); Krishnan Sugavanam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 12/696,746

(22) Filed: Jan. 29, 2010

(65) Prior Publication Data
US 2011/0173398 A1 Jul. 14, 2011

Related U.S. Application Data

(60) Provisional application No. 61/293,554, filed on Jan. 8, 2010, provisional application No. 61/261,269, filed on Nov. 13, 2009, provisional application No. 61/293,611, filed on Jan. 8, 2010, provisional application No. 61/295,669, filed on Jan. 15, 2010.

(51) Int. Cl.
*G06F 12/00* (2006.01)
*G06F 12/08* (2006.01)

(52) U.S. Cl. .......... 711/137; 711/E12.001; 711/E12.057
(58) Field of Classification Search .................. 711/137, 711/E12.001, E12.057
See application file for complete search history.

(56) References Cited

U.S. PATENT DOCUMENTS

| 5,666,514 | A | 9/1997 | Cheriton |
| 5,958,040 | A * | 9/1999 | Jouppi ......................... 712/207 |
| 6,047,363 | A | 4/2000 | Lewchuk |
| 2008/0016330 | A1 * | 1/2008 | El-Essawy et al. ........... 712/225 |

OTHER PUBLICATIONS

Office Action dated Jan. 9, 2012 received in a related U.S. Patent Application, namely U.S. Appl. No. 12/696,825.

* cited by examiner

*Primary Examiner* — Yong Choe
(74) *Attorney, Agent, or Firm* — Scully, Scott, Murphy & Presser, P.C; Daniel P. Morris, Esq.

(57) ABSTRACT

A prefetch system improves a performance of a parallel computing system. The parallel computing system includes a plurality of computing nodes. A computing node includes at least one processor and at least one memory device. The prefetch system includes at least one stream prefetch engine and at least one list prefetch engine. The prefetch system operates those engines simultaneously. After the at least one processor issues a command, the prefetch system passes the command to a stream prefetch engine and a list prefetch engine. The prefetch system operates the stream prefetch engine and the list prefetch engine to prefetch data to be needed in subsequent clock cycles in the processor in response to the passed command.

24 Claims, 3 Drawing Sheets

METHOD AND APPARATUS OF PARALLEL COMPUTING WITH SIMULTANEOUSLY OPERATING STREAM PREFETCHING AND LIST PREFETCHING ENGINES

CROSS-REFERENCE TO RELATED APPLICATIONS

This application claims the benefit of U.S. Patent Application Ser. Nos. 61/293,554, filed Jan. 8, 2010, for "TWO DIFFERENT PREFETCHING COMPLEMENTARY ENGINES OPERATING SIMULTANEOUSLY"; 61/261,269, filed Nov. 13, 2009 for "LOCAL ROLLBACK FOR FAULT-TOLERANCE IN PARALLEL COMPUTING SYSTEMS"; 61/293,611, filed Jan. 8, 2010 for "A MULTI-PETASCALE HIGHLY EFFICIENT PARALLEL SUPERCOMPUTER"; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of each of which is incorporated herein by reference; and is related to the following commonly-owned, co-pending United States Patent Applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,502, for "MEMORY SPECULATION IN A MULTI LEVEL CACHE SYSTEM"; U.S. patent application Ser. No. 13/008,583, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287, filed Jan. 8, 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATAFLOW"; U.S. patent application Ser. No. 12/723,277 for "EMBEDDING GLOBAL BARRIER AND COLLECTIVE IN A TORUS NETWORK";

U.S. patent application Ser. No. 61/293,499, filed Jan. 8, 2010 for "GLOBAL SYNCHRONIZATION OF PARALLEL PROCESSORS USING CLOCK PULSE WIDTH MODULATION"; U.S. patent application Ser. No. 61/293,266, filed Jan. 8, 2010 for "IMPLEMENTATION OF MSYNC"; U.S. patent application Ser. No. 12/796,389 for "NON-STANDARD FLAVORS OF MSYNC"; U.S. patent application Ser. No. 12/696,817 for "HEAP/STACK GUARD PAGES USING A WAKEUP UNIT"; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 12/774,475 for "REPRODUCIBILITY IN A MULTIPROCESSOR SYSTEM".

GOVERNMENT CONTRACT

This invention was Government supported under Contract No. B554331 awarded by Department of Energy. The Government has certain rights in this invention.

BACKGROUND

The present invention generally relates to a computing system. More particularly, the present invention relates to prefetching data to improve a performance of the computing system.

Prefetching refers to a technique used in a processor to improve processor speed. Traditionally, prefetching places data in a cache memory before the data is needed. Thus, when the data is needed, the data can be provided to the processor more quickly because the data already resides in the cache memory before being requested.

Traditionally, in a parallel computing system (e.g., IBM® Blue Gene®\L or Blue Gene®\P, etc.), a prefetch engine (i.e., a hardware module performing the prefetching) prefetches a fixed number of data streams with a fixed depth (i.e., a certain number of instructions, or a certain amount data to be fetched ahead) per a processor core or per a thread. However, this traditional prefetch engine fails to adapt to a data rate or a speed (e.g., 100 megabyte per second) of each data stream. This traditional stream prefetch engine does not prefetch proper data (i.e., data to be consumed by a processor core) ahead when a memory access pattern follows a complex pattern corresponding to non-consecutive memory addresses or when a processor core runs code in a repetitive manner (e.g., a "for" or "while" loop).

Therefore, it is desirable to improving a performance of a parallel computing system by operating at least two different prefetch engines, each of which prefetch a different set of data stored in a memory device according to these two different types of pattern (consecutive addresses or a random block of addresses but in a pattern in which a same memory block is repeatedly accessed).

SUMMARY OF THE INVENTION

The present invention describes a system, method and computer program product for improving a performance of a parallel computing system, e.g., by operating at least two different prefetch engines associated with a processor core.

In one embodiment, there is provided a data retrieval method in a parallel computing system, the parallel computing system including a plurality of computing nodes, a computing node including at least one processor and at least one memory device, the method comprising:

issuing, at a processor, a command;
passing the command to a stream prefetch engine and a list prefetch engine; and
operating the stream prefetch engine and the list prefetch engine to prefetch data to be needed in subsequent clock cycles in the processor in response to the passed command.

In one embodiment, there is provided an apparatus for retrieving data in a parallel computing system, the parallel computing system including a plurality of computing nodes, a computing node including at least one processor and at least one memory device, the apparatus comprising:

a processor for issuing a command;
means for passing the command to a stream prefetch engine and a list prefetch engine; and
the stream prefetch engine and the list prefetch engine for prefetching data to be needed in subsequent clock cycles in the processor in response to the passed command.

In a further embodiment, the stream prefetch engine and the list prefetch engine work simultaneously.

In a further embodiment, data prefetched by the stream prefetch engine and data prefetched by the at least one list prefetch engine are stored in an array or buffer without a distinction.

In a further embodiment, the look-up engine comprises: a comparator for comparing an address in the command and addresses that have been prefetched or for which prefetch requests have been issued.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
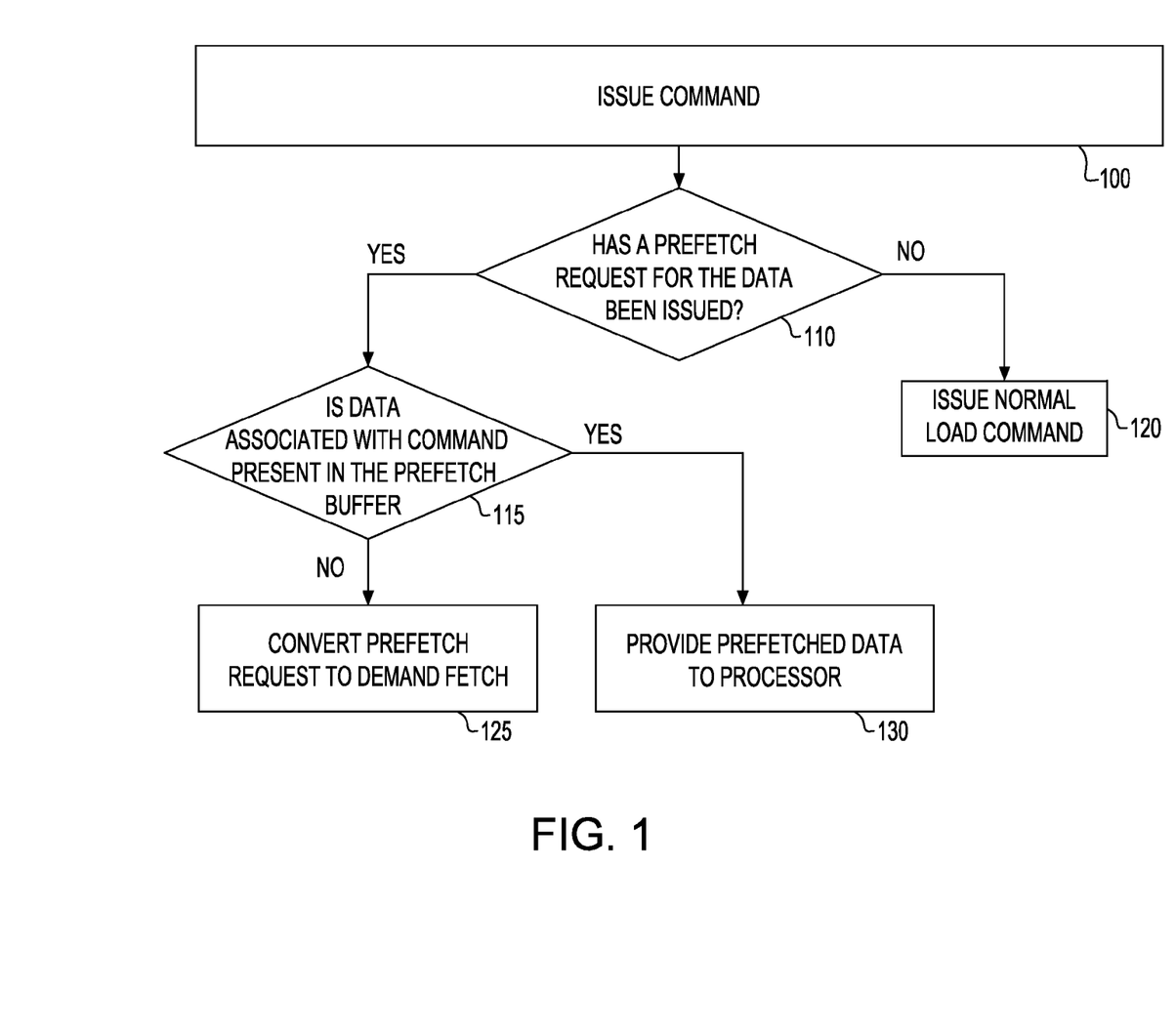
FIG. 1 illustrates a flow chart including method steps for processing load commands from a processor when data being requested may have been or be in a process of being prefetched in a parallel computing system in one embodiment.

FIG. 1 illustrates a flow chart for responding to commands issued by a processor when prefetched data may be available because of an operation of one or more different prefetch engines in one embodiment. A parallel computing system may include a plurality of computing nodes. A computing node may include, without limitation, at least one processor and/or at least one memory device. At step 100, a processor (e.g., IBM® PowerPC®, A2 core 200 in FIG. 2, etc.) in a computing node in the parallel computing system issues a command. A command includes, without limitation, an instruction (e.g., Load from and/or Store to a memory device, etc.) and/or a prefetching request (i.e., a request for prefetching of data or instruction(s) from a memory device). A command also refers to a request, vice versa. A command and a request are interchangeably used in this disclosure. A command or request includes, without limitation, instruction codes, addresses, pointers, bits, flags, etc.

At step 110, a look-up engine (e.g., a look-up engine 315 in FIG. 2) evaluates whether a prefetch request has been issued for first data (e.g., numerical data, string data, instructions, etc.) associated with the command. The prefetch request (i.e., a request for prefetching data) may be issued by a prefetch engine (e.g., a stream prefetch engine 275 or a list prefetch engine 280 in FIG. 2). In one embodiment, to make the determination, the look-up engine compares a first address in the command and second addresses for which prefetch requests have been issued or that have been prefetched. Thus, the look-up engine may include at least one comparator. The parallel computing system may further include an array or table (e.g., a prefetch directory 310 in FIG. 2) for storing the addresses for which prefetch requests have been previously issued by the one or more simultaneously operating prefetch engines. The stream prefetch engine 275 and the list prefetch engine 280 are described in detail below.

At step 110, if the look-up engine determines that a prefetch request has not been issued for the first data, e.g., the first data address is not found in the prefetch directory 310, at step 120, then a normal load command is issued to a memory system.

At step 110, if the look-up engine determines that a prefetch request has been issued for the first data, then the look-up engine determines whether the first data is present in a prefetch data array (e.g., a prefetch data array 250 in FIG. 2), e.g., by examining a data present bit (e.g., a bit indicating whether data is present in the prefetch data array) in step 115. If the first data has already been prefetched and is resident in the prefetch data array, at step 130, then the first data is passed directly to the processor, e.g., by a prefetch system 320 in FIG. 2. If the first data has not yet been received and is not yet in the prefetch data array, at step 125, then the prefetch request is converted to a demand load command (i.e., a command requesting data from a memory system) so that when the first data is returned from the memory system it may be transferred directly to the processor rather than being stored in the prefetch data array awaiting a later processor request for that data.

The look-up engine also provides the command including an address of the first data to two at least two different prefetch engines simultaneously. These two different prefetch engines include, without limitation, at least one stream prefetch engine (e.g., a stream prefetch engine 275 in FIG. 2) and one or more list prefetch engine, e.g., at least four list prefetch engines (e.g., a list prefetch engine 280 in FIG. 2). A stream prefetch engine uses the first data address to initiate a possible prefetch command for second data (e.g., numerical data, string data, instructions, etc.) associated with the command. For example, the stream prefetch engine fetches ahead (e.g., 10 clock cycles before when data or an instruction is expected to be needed) one or more 128 byte L2 cache lines of data and/or instruction according to a prefetching depth. A prefetching depth refers to a specific amount of data or a specific number of instructions to be prefetched in a data or instruction stream.

In one embodiment, the stream prefetch engine adaptively changes the prefetching depth according to a speed of each stream. For example, if a speed of a data or instruction stream is faster than speeds of other data or instruction streams (i.e., that faster stream includes data which is requested by the processor but is not yet resident in the prefetch data directory), the stream prefeteh engine runs the step 115 to convert a prefetch request for the faster stream to a demand load command described above. The stream prefetch engine increases a prefetching depth of the fastest data or instruction stream. In one embodiment, there is provided a register array for specifying a prefetching depth of each stream. This register array is preloaded by software at the start of running the prefetch system (e.g., the prefetch system 320 in FIG. 2) and then the contents of this register array vary as faster and slower streams are identified. For example, if a first data stream includes an address which is requested by a processor and corresponding data is found to be resident in the prefetch data array and a second data stream includes an address for which prefetched data which has not yet arrived in the prefetch data array. The stream prefetch engines reduces a prefetching depth of the first stream, e.g., by decrementing a prefetching depth of a first stream in the register array. The stream prefetch engine increases a prefetching depth of the second stream, e.g., by incrementing a prefetching depth of a second stream in the register array. If a speed of a data or instruction stream is slower than speeds of other data or instruction streams, the stream prefetch engine decreases a prefetching depth of the slowest data or instruction stream. In another embodiment, the stream prefetch engine increases a prefetching depth of a stream when the command has a valid address of a cache line but there is no valid data corresponding to the cache line. To increase a prefetching depth of a stream, the stream prefetch engine steals and decreases a prefetching depth of a least recently used stream having a non-zero prefetching depth. In one embodiment, the stream prefetch engine prefetches at least sixteen data or instruction streams. In another embodiment, the stream prefetch engine prefetches at most or at least sixteen data or instruction streams. A detail of the stream prefetch engines is described in Peter Boyle et al. "Programmable Stream Prefetch with Resource Optimization," wholly incorporated by reference as if set forth herein. In an embodiment described in FIG. 1, the stream prefetch engine prefetches second data associated with the command according to a prefetching depth. For example, when a prefetching depth of a stream is set to two, a cache line miss occurs at a cache line address "L1" and another cache line miss subsequently occurs at a cache line address "L1+1," the stream prefetch engine prefetch cache lines addressed at "L1+2" and "L1+3."

The list prefetch engine(s) prefetch(es) third data associated with the command. In one embodiment, the list prefetch engine(s) prefetch(es) the third data (e.g., numerical data, string data, instructions, etc.) according to a list describing a sequence of addresses that caused cache misses. The list prefetch engine(s) prefetches data or instruction(s) in a list associated with the command. In one embodiment, there is provided a module for matching between a command and a list. A match would be found if an address requested in the command and an address listed in the list are same. If there is a match, the list prefetch engine(s) prefetches data or instruction(s) in the list up to a predetermined depth ahead of where the match has been found. A detail of the list prefetch engine(s) is described in described in Peter Boyle et al., "List Based Prefetch," wholly incorporated by reference as if set forth herein.

The third data prefetched by the list prefetch engine or the second data prefetched by the stream prefetch engine may include data that may subsequently be requested by the processor. In other words, even if one of the engines (the stream prefetch engine and the list prefetch engine) fails to prefetch this subsequent data, the other engine succeeds to prefetch this subsequent data based on the first data that both prefetch engines use to initiate further data prefetches. This is possible because the stream prefetch engine is optimized for data located in consecutive memory locations (e.g., streaming movie) and the list prefetch engine is optimized for a block of randomly located data that is repetitively accessed (e.g., loop). The second data and the third data may include different set of data and/or instruction(s).

In one embodiment, the second data and the third data are stored in an array or buffer without a distinction. In other words, data prefetched by the stream prefetch engine and data prefetched by the list prefetch engine are stored together without a distinction (e.g., a tag, a flag, a label, etc.) in an array or buffer.

In one embodiment, each of the list prefetch engine(s) and the stream prefetch engine(s) can be turned off and/or turned on separately. In one embodiment, the stream prefetch engine(s) and/or list prefetch engine(s) prefetch data and/or instruction(s) that have not been prefetched before and/or have not listed in the prefetch directory 310.

In one embodiment, the parallel computing system operates the list prefetch engine occasionally (e.g., when a user bit(s) are set). A user bit(s) identify a viable address to be used, e.g., by a list prefetch engine. The parallel computing system operates the stream prefetch engine all the time.

In one embodiment, if the look-up engine determines that the first data has not been prefetched, at step 110, the parallel computing system immediately issues the load command for this first data to a memory system. However, it also provides an address of this first data to the stream prefetch engine and/or at least one list prefetch engine which use this address to determine further data to be prefetched. The prefetched data may be consumed by the processor core 200 in subsequent clock cycles. A method to determine and/or identify whether the further data needs to be prefetched is described in Peter Boyle et al. "Programmable Stream Prefetch with Resource Optimization," U.S. Pat. No. 12/684,693 and/or Peter Boyle et al., "List Based Prefetch," U.S. Pat. No. 61/293,552, which are wholly incorporated by reference as if set forth herein. Upon determining and/or identifying the further data to be prefetched, the stream prefetch engine may establish a new stream and prefetch data in the new stream or prefetch additional data in an existing stream. At the same time, upon determining and/or identifying the further data to be prefetched, the list prefetch engine may recognize a match between the address of this first data and an earlier L1 cache miss address (i.e., an address caused a prior L1 cache miss) in a list and prefetch data from the subsequent cache miss addresses in the list separated by a predetermined "list prefetch depth", e.g., a particular number of instructions and/or a particular amount of data to be prefetched by the list prefetch engine.

A parallel computing system which has at least one stream and at least one list prefetch engine may run more efficiently if both types of prefetch engines are provided. In one embodiment, the parallel computing system allows these two different prefetch engines (i.e., list prefetch engines and stream prefetch engines) to run simultaneously without serious interference. The parallel computing system can operate the list prefetch engine, which may require a user intervention, without spoiling benefits for the stream prefetch engine.

In one embodiment, the stream prefetch engine 275 and/or the list prefetch engine 280 is implemented in hardware or reconfigurable hardware, e.g., FPGA (Field Programmable Gate Array) or CPLD (Complex Programmable Logic deviceDevice), using a hardware description language (Verilog, VHDL, Handel-C, or System C). In another embodiment, the stream prefetch engine 275 and/or the list prefetch engine 280 is implemented in a semiconductor chip, e.g., ASIC (Application-Specific Integrated Circuit), using a semi-custom design methodology, i.e., designing a chip using standard cells and a hardware description language. In one embodiment, the stream prefetch engine 275 and/or the list prefetch engine 280 is implemented in a processor (e.g., IBM® PowerPC® processor, etc.) as a hardware unit(s). In another embodiment, the stream prefetch engine 275 and/or the list prefetch engine 280 is/are implemented in software (e.g., a compiler or operating system), e.g., by a programming language (e.g., Java®, C/C++, .Net, Assembly language(s), Pearl, etc.). When the stream prefetch engine 275 is implemented in a compiler, the compiler adapts the prefetching depth of each data or instruction stream.

Figure 2:
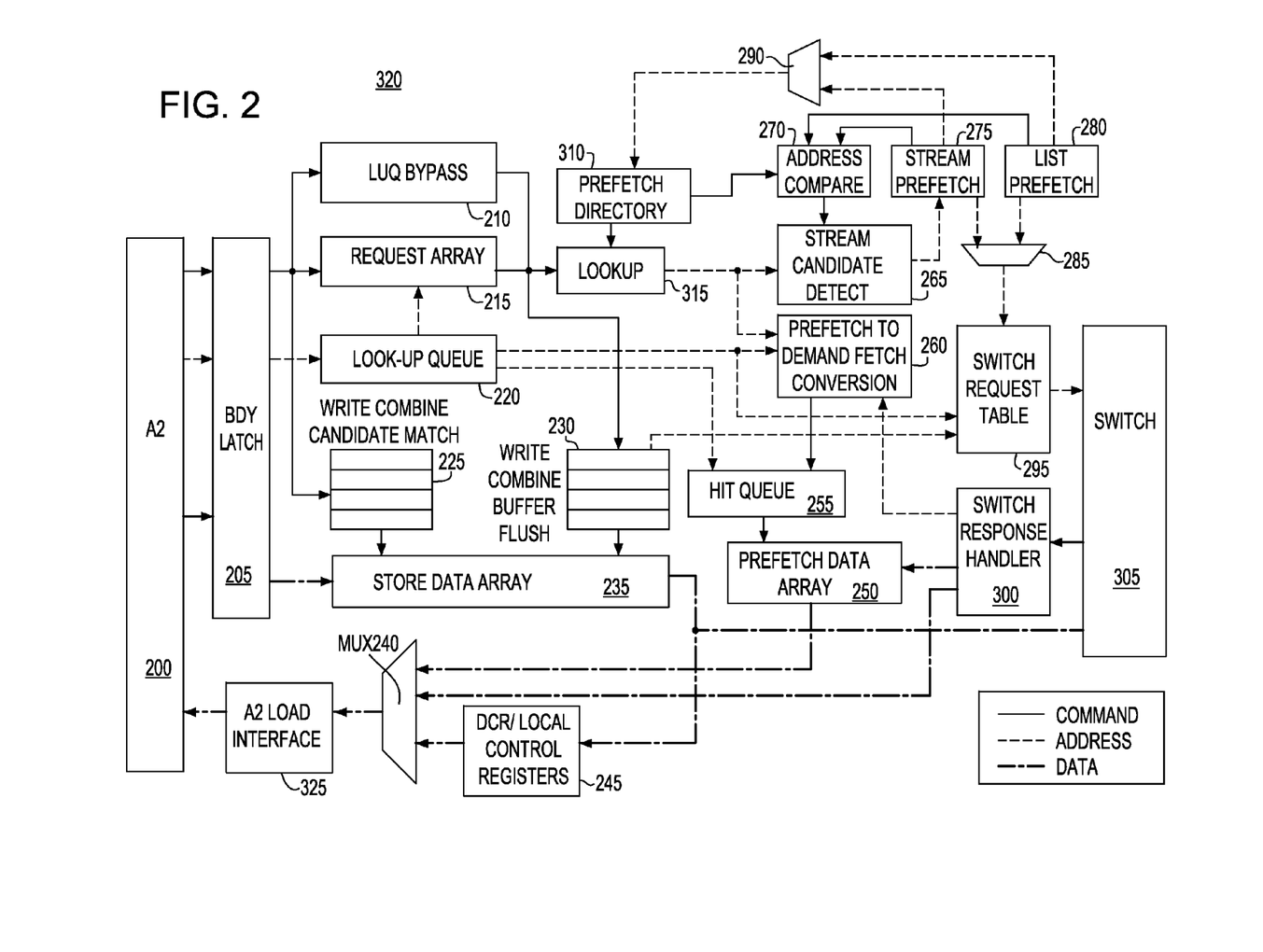
FIG. 2 illustrates a system diagram for prefetching data in a parallel computing system in one embodiment.

FIG. 2 illustrates a system diagram of a prefetch system for improving performance of a parallel computing system in one embodiment. The prefetch system 320 includes, but is not limited to: a plurality of processor cores (e.g., A2 core 200, IBM® PowerPC®), at least one boundary register (e.g., a latch 205), a bypass engine 210, a request array 215, a look-up queue 220, at least two write-combine buffers (e.g., a write-combine buffers 225 and 230), a store data array 235, a prefetch directory 310, a look-up engine 315, a multiplexer 290, an address compare engine 270, a stream prefetch engine 275, a list prefetch engine 280, a multiplexer 285, a stream detect engine 265, a fetch conversion engine 260, a hit queue 255, a prefetch data array 250, a switch request table 295, a switch response handler 300, a switch 305, at least one local control register 245, a multiplexer 240, an interface logic 325.

The prefetch system 320 is a module that provides an interface between the processor core 200 and the rest of the parallel computing system. Specifically, the prefetch system 320 provides an interface to the switch 305 and an interface to a computing node's DCR (Device Control Ring) and local control registers special to the prefetch system 320. The system 320 performs performance critical tasks including, without limitations, identifying and prefetching memory access patterns, managing a cache memory device for data resulting from this identifying and prefetching. In addition, the system 320 performs write combining (e.g., combining four or more write commands into a single write command) to enable multiple writes to be presented as a single write to the switch 305, while maintaining coherency between the write combine arrays.

The processor core 200 issue at least one command including, without limitation, an instruction requesting data. The at least one register 205 buffers the issued command, at least one address in the command and/or the data in the commands. The bypass engine 210 allows a command to bypass the look-up queue 220 when the look-up queue 220 is empty.

The look-up queue 220 receives the commands from the register 205 and also outputs the earliest issued command among the issued commands to one or more of: the request array 215, the stream detect engine 260, the switch request table 295 and the hit queue 255. In one embodiment, the queue 220 is implemented in as a FIFO (First In First Out) queue. The request array 215 receives at least one address from the register 205 associated with the command. In one embodiment, the addresses in the request array 215 are indexed to the corresponding command in the look-up queue 220. The look-up engine 315 receives the ordered commands from the bypass engine 210 or the request array 215 and compares an address in the issued commands with addresses in the prefetch directory 310. The prefetch directory 310 stores addresses of data and/or instructions for which prefetch commands have been issued by one of the prefetch engines (e.g., a stream prefetch 275 and a list prefetch engine 280).

The address compare engine 270 receives addresses that have been prefetched from the at least one prefetch engine (e.g., the stream prefetch engine 275 and/or the list prefetch engine 280) and prevents the same data from being prefetched twice by the at least one prefetch engine. The address compare engine 270 allows a processor core to request data not present in the prefetch directory 310. The stream detect engine 265 receives address(es) in the issued commands from the look-up engine 315 and detects at least one stream to be used in the stream prefetch engine 275. For example, if the addresses in the issued commands are "L1" and "L1+1," the stream prefetch engine may prefetch cache lines addressed at "L1+2" and "L1+3."

In one embodiment, the stream detect engine 265 stores at least one address that caused a cache miss. The stream detect engine 265 detects a stream, e.g., by incrementing the stored address and comparing the incremented address with an address in the issued command. In one embodiment, the stream detect engine 265 can detect at least sixteen streams. In another embodiment, the stream detect engine can detect at most sixteen streams. The stream detect engine 265 provides detected stream(s) to the stream prefetch engine 275. The stream prefetch engine 275 issues a request for prefetching data and/instructions in the detected stream according to a prefetching depth of the detected stream.

The list prefetch engine 280 issues a request for prefetching data and/or instruction(s) in a list that includes a sequence of address that caused cache misses. The multiplexer 285 forwards the prefetch request issued by the list prefetch engine 280 or the prefetch request issued by the stream prefetch engine 275 to the switch request table 295. The multiplexer 290 forwards the prefetch request issued by the list prefetch engine 280 or the prefetch request issued by the stream prefetch engine 275 to the prefetch directory 310. A prefetch request may include memory address(es) where data and/or instruction(s) are prefetched. The prefetch directory 310 stores the prefetch request(s) and/or the memory address (es).

The switch request table 295 receives the commands from the look-up queue 220 and the forwarded prefetch request from the multiplexer 285. The switch request table 295 stores the commands and/or the forwarded request. The switch 305 retrieves the commands and/or the forwarded request from the table 295, and transmits data and/instructions demanded in the commands and/or the forwarded request to the switch response handler 300. Upon receiving the data and/or instruction(s) from the switch 305, the switch response handler 300 immediately delivers the data to the processor core 200, e.g., via the multiplexer 240 and the interface logic 325. At the same time, if the returned data or instruction(s) is the result of a prefetch request the switch response handler 300 delivers the data or instruction(s) from the switch 305 to the prefetch conversion engine 260 and delivers the data and/or instruction (s) to the prefetch data array 250.

The prefetch conversion engine 260 receives the commands from the look-up queue 220 and/or information bits accompanying data or instructions returned from the switch response handler 300. The conversion engine 260 converts prefetch requests to demand fetch commands if the processor requests data that were the target of a prefetch request issued earlier by one of the prefetch units but has not yet been fulfilled. The conversion engine 260 will then identify this prefetch request when it returns from the switch 305 through the switch response handler 300 as a command that was converted from a prefetch request to a demand load command. This returning prefetch data from the switch response handler 300 is then routed to the hit queue 255 so that it is quickly passed through the prefetch data array 250 on the processor core 200. The hit queue 255 may also receive the earliest command (i.e., the earliest issued command by the processor core 200) from the look-up queue 220 if that command requests data that is already present in the prefetch data array 250. In one embodiment, when issuing a command, the processor core 200 attaches generation bits (i.e., bits representing a generation or age of a command) to the command. Values of the generation bits may increase as the number of commands issued increases. For example, the first issued command may have "0" in the generation bits. The second issued command may be "1" in the generation bits. The hit queue 255 outputs instructions and/or data that have been prefetched to the prefetch data array 250.

The prefetch data array 250 stores the instructions and/or data that have been prefetched. In one embodiment, the prefetch data array 250 is a buffer between the processor core 200 and a local cache memory device (not shown) and stores data and/or instructions prefetched by the stream prefetch engine 275 and/or list prefetch engine 280. The switch 305 may be an interface between the local cache memory device and the prefetch system 320.

In one embodiment, the prefetch system 320 combines multiple candidate writing commands into, for example, four writing commands when there is no conflict between the four writing commands. For example, the prefetch system 320 combines multiple "store" instructions, which could be instructions to various individual bytes in the same 32 byte word, into a single store instruction for that 32 byte word. Then, the prefetch system 320 stores these coalesced single writing commands to at least two arrays called write-combine buffers 225 and 230. These at least two write-combine buffers are synchronized with each other. In one embodiment, a first write-combine buffer 225 called write-combine candidate match array may store candidate writing commands that can be combined or concatenated immediately as they are issued by the processor core 200. The first write-combine buffer 225 receives these candidate writing commands from the register 205. A second write-combine buffer 230 called write-combine buffer flush receives candidate writing commands that can be combined from the bypass engine 210 and/or the request array 215 and/or stores the single writing commands that combine a plurality of writing commands when these (uncombined) writing commands reach the tail of the look-up queue 220. When these write-combine arrays become full or need to be flushed to make the contents of a memory system be up-to-date, these candidate writing commands and/or single writing commands are stored in an array 235 called store data array. In one embodiment, the array 235 may also store the data from the register 205 that is associated with these single writing commands.

The switch 305 can retrieve the candidate writing commands and/or single writing commands from the array 235. The prefetch system 320 also transfers the candidate writing commands and/or single writing commands from the array 235 to local control registers 245 or a device command ring (DCR), i.e., a register storing control or status information of the processor core. The local control register 245 controls a variety of functions being performed by the prefetch system 320. This local control register 245 as well as the DCR can also be read by the processor core 200 with the returned read data entering the multiplexer 240. The multiplexer 240 receives, as inputs, control bits from the local control register 245, the data and/or instructions from the switch response handler 300 and/or the prefetched data and/or instructions from the prefetch data array 250. Then, the multiplexer 240 forwards one of the inputs to the interface logic 325. The interface logic 325 delivers the forwarded input to the processor core 200. All of the control bits as well as I/O commands (i.e., an instruction for performing input/output operations between a processor and peripheral devices) are memory mapped and can be accessed either using memory load and store instructions which are passed through the switch 305 or are addressed to the DCR or local control registers 245.

Look-Up Engine

Figure 3:
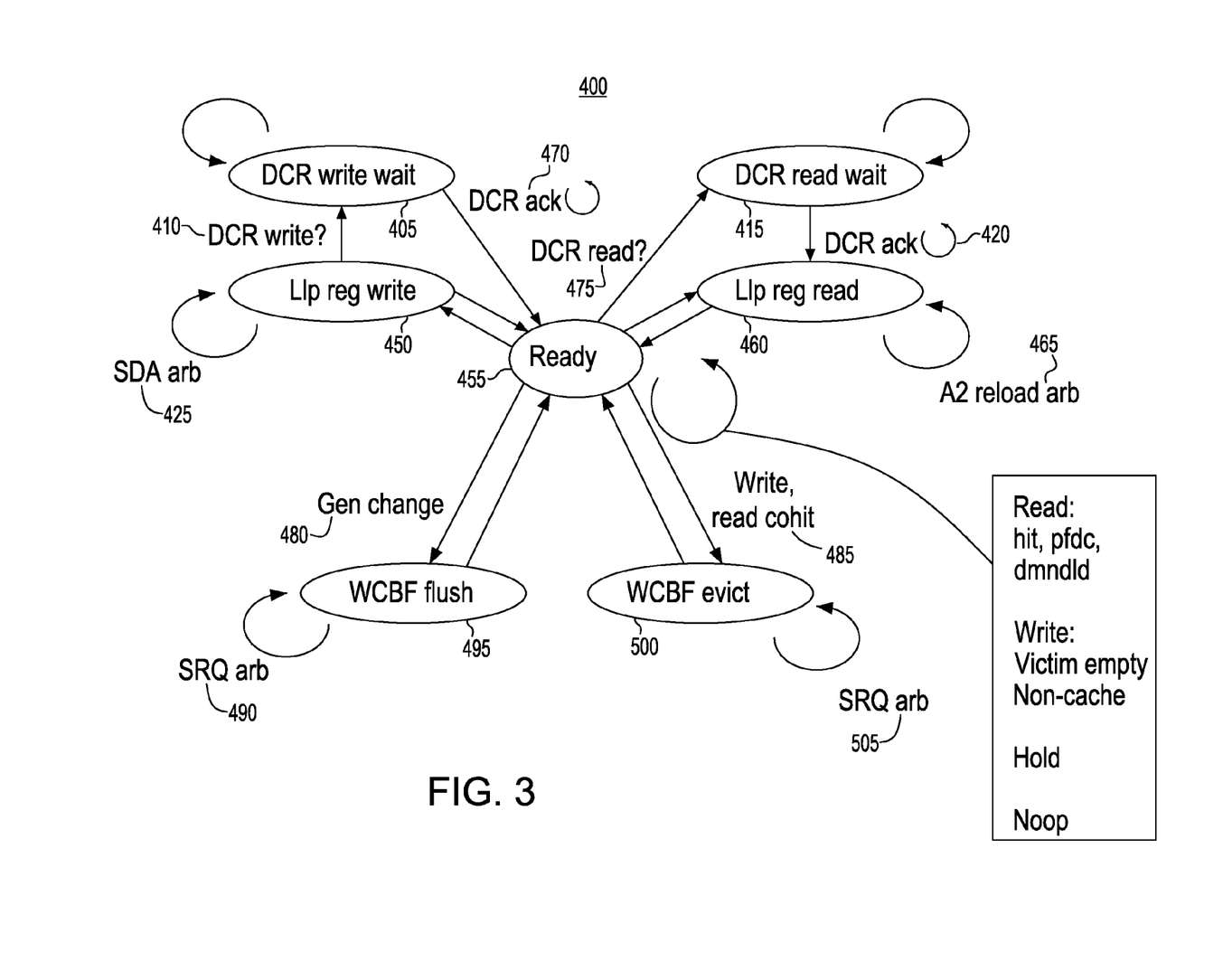
FIG. 3 illustrates a state machine 400 that operate the look-up engine 400 in one embodiment.

FIG. 3 illustrates a state machine 400 that operates the look-up engine 315 in one embodiment. In one embodiment, inputs from the look-up queue 220 are latched in a register (not shown). This register holds its previous value if a "hold" bit is asserted by the state machine 400 and preserved for use when the state machine 400 reenters a new request processing state. Inputs to the state machine 400 includes, without limitation, a request ID, a valid bit, a request type, a request thread, a user defining the request, a tag, a store index, etc.

By default, the look-up engine 315 is in a ready state 455 (i.e., a state ready for performing an operation). Upon receiving a request (e.g., a register write command), the look-up engine 315 goes to a register write state 450 (i.e., a state for updating a register in the prefetch system 320). In the register write state 450, the look-up engine 315 stays in the state 450 until receiving an SDA arbitration input 425 (i.e., an input indicating that the write data from the SDA has been granted access to the local control registers 245). Upon completing the register update, the look-up engine 315 goes back to the ready state 455. Upon receiving a DCR write request 410 (i.e., a request to write in the DCR) from the processor core 200, the look-up engine 315 goes from the register write state 450 to a DCR write wait state 405 (i.e., a state for performing a write to DCR). Upon receiving a DCR acknowledgement 470 from the DCR, the look-up engine 315 goes from the DCR write wait state 405 to the ready state 455.

The look-up engine 315 goes from the ready state 455 to a DCR read wait 415 (i.e., a state for preparing to read contents of the DCR) upon receiving a DCR ready request 475 (i.e., a request for checking a readiness of the DCR). The look-up engine 315 stays in the DCR read wait state 415 until the look-up engine 315 receives the DCR acknowledgement 420 from the DCR. Upon receiving the DCR acknowledgement, the look-up engine 315 goes from the DCR read wait state 415 to a register read state 460. The look-up engine 315 stays in the register read state 415 until a processor core reload arbitration signal 465 (i.e., a signal indicating that the DCR read data has been accepted by the interface 325) is asserted.

The look-up engine 315 goes from the ready state 455 to the register read state 460 upon receiving a register read request (i.e., a request for reading contents of a register). The look-up engine 315 comes back to ready state 455 from the register read state 460 upon completing a register read. The look-up engine 315 stays in the ready state 455 upon receiving one or more of: a hit signal (i.e., a signal indicating a "hit" in an entry in the prefetch directory 310), a prefetch to demand fetch conversion signal (i.e., a signal for converting a prefetch request to a demand to a switch or a memory device), a demand load signal (i.e., a signal for loading data or instructions from a switch or a memory device), a victim empty signal (i.e., a signal indicating that there is no victim stream to be selected by the stream prefetch engine 275), a load command for data that must not be put in cache (a non-cache signal), a hold signal (i.e., a signal for holding current data), a noop signal (i.e., a signal indicating no operation).

The look-up engine 315 goes to the ready state 455 to a WCBF evict state 500 (i.e., a state evicting an entry from the WCBF array 230) upon receiving a WCBF evict request 485 (i.e., a request for evicting the WCBF entry). The look-up engine 315 goes back to the ready state 455 from the WCBF evict state 500 upon completing an eviction in the WCBF array 230. The look-up engine 315 stays in the WCBF evict state 500 while a switch request queue (SRQ) arbitration signal 505 is asserted.

The look-up engine 315 goes from the ready state 455 to a WCBF flush state 495 upon receiving a WCBF flush request 480 (i.e., a request for flushing the WCBF array 230). The look-up engine 315 goes back to the ready state 455 from the WCBF flush state 495 upon a completion of flushing the WCBF array 230. The look-up engine 315 stays in the WCBF flush state 495 while a switch request queue (SRQ) arbitration signal 490 is asserted.

In one embodiment, most state transitions in the state machine 400 are done in a single cycle. Whenever a state transition is scheduled, a hold signal is asserted to prevent further advance of the look-up queue 220 and to ensure that a register at a boundary of the look-up queue 220 retains its value. This state transition is created, for example, by a read triggering two write combine array evictions for coherency maintenance. Generation change triggers a complete flush of the WCBF array 230 over multiple clock cycles.

The look-up engine 315 outputs the following signals going to the hit queue 255, SRT (Switch Request Table) 295, demand fetch conversion engine 260, and look-up queue 220: critical word, a tag (bits attached by the processor core 200 to allow it to identify a returning load command) indicating thread ID, 5-bit store index, a request index, a directory index indicating the location of prefetch data for the case of a prefetch hit, etc.

In one embodiment, a READ combinational logic (i.e., a combinational logic performing a memory read) returns a residency of a current address and next consecutive addresses. A STORE combinational logic (i.e., a combinational logic performing a memory write) returns a residency of a current address and next consecutive addresses and deasserts an address valid bit for any cache lines matching this current address.

Hit Queue

In one exemplary embodiment, the hit queue 255 is implemented, e.g., by 12 entry×12-bit register array holds pending hits (hits for prefetched data) for a presentation to the interface 245 of the processor core. Read and write pointers are maintained in one or two clock cycle domain. Each entry of the hit queue includes, without limitation, a critical word, a directory index and a processor core tag.

Prefetch Data Array

In one embodiment, the prefetch data array 250 is implemented, e.g., by a dual ported 32×128-byte SRAM operating in one or two clock cycle domain. A read port is driven, e.g., by the hit queue and the write port is driven, e.g., by switch response handler 300.

Prefetch Directory

The prefetch directory 310 includes, without limitation, a 32×48-bit register array storing information related to the prefetch data array 250. It is accessed by the look-up engine 315 and written by the prefetch engines 275 and 280. The prefetch directory 310 operates in one or two clock cycle domain and is timing and performance critical. There is provided a combinatorial logic associated with this prefetch directory 310 including a replication count of address comparators.

Each prefetch directory entry includes, without limitation, an address, an address valid bit, a stream ID, data representing a prefetching depth. In one embodiment, the prefetch directory 310 is a data structure and may be accessed for a number of different purposes.

Look-Up and Stream Comparators

In one embodiment, at least two 32-bit addresses associated with commands are analyzed in the address compare engine 270 as a particular address (e.g., $35^{th}$ bit to $3^{rd}$ bit) and their increments. A parallel comparison is performed on both of these numbers for each prefetch directory entry. The comparators evaluate both carry and result of the particular address (e.g., $2^{nd}$ bit to $0^{th}$ bit)+0, 1, . . . , or 7. The comparison bits (e.g., $35^{th}$ bit to $3^{rd}$ bit in the particular address) with or without a carry and the first three bits (e.g., $2^{nd}$ bit to 0th bit in the particular address) are combined to produce a match for lines N, N+1 to N+7 in the hit queue 255. This match is used by look-up engine 315 for both read, and write coherency and for deciding which line to prefetch for the stream prefetch engine 275. If a write signal is asserted by the look-up engine 315, a matching address is invalidated and subsequent read look-ups (i.e., look-up operations in the hit queue 255 for a read command) cannot be matched. A line in the hit queue 255 will become unlocked for reuse once any pending hits, or pending data return if the line was in-flight, have been fulfilled.

LIST Prefetch Comparators

In one embodiment, address compare engine 270 includes, for example, 32×35-bit comparators returning "hit" (i.e., a signal indicating that there exists prefetched data in the prefetch data array 250 or the prefetch directory 310) and "hit index" (i.e., a signal representing an index of data being "hit") to the list prefetch engine 280 in one or two clock cycle period(s). These "hit" and "hit index" are used to decide whether to service or discard a prefetch request from the list prefetch engine 280. The prefetch system 320 does not establish the same cache line twice. The prefetch system 320 discards prefetched data or instruction(s) if it collides with an address in a write combine array (e.g., array 225 or 230).

Automatic Stream Detection, Manual Stream Touch

All or some of the read commands that cause a miss when looked up in the prefetch directory 310 are snooped by the stream detect engine 265. The stream detect engine 265 includes, without limitation, a table of expected next aligned addresses based on previous misses to prefetchable addresses. If a confirmation (i.e., a stream is detected, e.g., by finding a match between an address in the table and an address forwarded by the look-up engine) is obtained (e.g., by a demand fetch issued on a same cycle), the look-up queue 220 is stalled on a next clock cycle and a cache line is established in the prefetch data array 250 starting from an (aligned) address to the aligned address. The new stream establishment logic is shared with at least 16 memory mapped registers, one for each stream that triggers a sequence of four cache lines to be established in the prefetch data array 250 with a corresponding stream ID, starting with the aligned address written to the register.

When a new stream is established the following steps occur
The look-up queue 220 is held.
A victim stream ID is selected.
The current depth for this victim stream ID is returned to the "free pool" and its depth is reset to zero.
A register whose value can be set by software determines an initial prefetch depth for the new streams.
"N" cache lines are established on at least "N" clock cycles and a prefetching depth for this new stream is incremented up to "N", e.g., by adaptively stealing a depth from a victim stream.

Prefetch-to-Demand-Fetch Conversion Engine

In one embodiment, the demand fetch conversion engine 260 includes, without limitation, an array of, for example, 16 entries×13 bits representing at least 14 hypothetically possible prefetch to demand fetch conversions (i.e., a process converting a prefetch request to a demand for data to be returned immediately to the processor core 200). The information bits of returning prefetch data from the switch 305 is compared against this array. If this comparison determines that this prefetch data has been converted to demand fetch data (i.e., data provided from the switch 305 or a memory system), these entries will arbitrate for access to the hit queue 255, waiting for free clock cycles. These entries wait until the cache line is completely entered before requesting an access to the hit queue 255. Each entry in the array in the engine 260 includes, without limitation, a demand pending bit indicating a conversion from a prefetch request to a demand load command when set, a tag for the prefetch, an index identifying the target location in the prefetch data array 250 for the prefetch and a critical word associated with the demand.

ECC and Parity

In one embodiment, data paths and/or prefetch data array 250 will be ECC protected, i.e., errors in the data paths and/or prefetch data array may be corrected by ECC (Error Correction Code). In one embodiment, the data paths will be ECC protected, e.g., at the level of 8-byte granularity. Sub 8-byte data in the data paths will by parity protected at a byte level, i.e., errors in the data paths may be identified by a parity bit. Parity bit and/or interrupts may be used for the register array 215 which stores request information (e.g., addresses and status bits). In one embodiment, a parity bit is implemented on narrower register arrays (e.g., an index FIFO, etc.). There can be a plurality of latches in this module that may affect a program function. Unwinding logical decisions made by the prefetch system 320 based on detected soft errors in addresses and request information may impair latency and performance. Parity bit implementation on the bulk of these decisions is possible. An error refers to a signal or datum with a mistake.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention. The present invention may also include a computer program product for one or more functions of this invention. The computer program product includes a storage medium (e.g., a disk, optical disc, memory device, solid-state drive, etc.) readable by a processing circuit and storing instructions run by the processing circuit for performing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A data retrieval method for a parallel computing system, the parallel computing system including a plurality of computing nodes, a computing node including at least one processor and at least one memory device, the method comprising:
    issuing, at a processor, a command;
    passing the command to a stream prefetch engine and a list prefetch engine; and
    operating the stream prefetch engine and the list prefetch engine to prefetch data to be needed in subsequent clock cycles in the processor in response to the passed command,
    wherein the operating the stream prefetch engine includes steps of:
        determining a slowest data or instruction stream and a fastest data or instruction stream, based on speeds of data or instruction streams processed by the processor;
        decreasing a prefetching depth of the slowest data or instruction stream, the prefetching depth referring to a specific amount of data or instructions to be prefetched; and
        increasing the prefetching depth of the fastest data or instruction stream by the decreased prefetching depth of the slowest data or instruction stream.

2. The method according to claim 1, further comprising:
    determining whether data requested in the command has been prefetched.

3. The method according to claim 2, wherein the determining comprises:
    comparing an address in the command and addresses for which prefetch requests have been issued.

4. The method according to claim 2, further comprising:
    issuing a load command for the requested data to a memory system in response to determining that the requested data has not been prefetched.

5. The method according to claim 1, wherein the stream prefetch engine and the list prefetch engine work simultaneously.

6. The method according to claim 1, further comprising:
    determining, at the stream prefetch engine and the list prefetch engine, whether the data to be needed in subsequent clock cycles can be identified and prefetched.

7. The method according to claim 6, wherein the stream prefetch engine establishes a new stream and prefetches data in the new stream or prefetches additional data in an existing stream in response to determining that the data to be needed can be identified and prefetched.

8. The method according to claim 6, wherein the list prefetch engine detects a match between an address in the command and an earlier cache miss address in a list and prefetches data in subsequent cache miss addresses in the list in response to determining that the data to be needed can be identified and prefetched.

9. The method according to claim 1, wherein the parallel computing system includes at least four list prefetch engines.

10. The method according to claim 1, wherein if one of the engines fails to prefetch the data to be needed, the other engine succeeds to prefetch the data to be needed.

11. The method according to claim 1, wherein data prefetched by the stream prefetch engine and data prefetched by the at least one list prefetch engine are stored in an array or buffer without a distinction.

12. The method according to claim 11, further comprising:
    if a first data or instruction stream includes a first address which is requested by the processor and corresponding data is found to be resident in the array and a second data or instruction stream includes a second address for which prefetched data which has not yet arrived in the array, decrementing the prefetching depth of the first stream and incrementing the prefetching depth of the second stream.

13. A non-transitory computer program product for improving a performance of a parallel computing system, the parallel computing system including a plurality of computing nodes, a computing node including at least one processor and at least one memory device, the computer program product comprising a non-transitory storage medium readable by a processing circuit and storing instructions run by the processing circuit for performing a method according to claim 1.

14. An apparatus for retrieving data in a parallel computing system, the parallel computing system including a plurality of computing nodes, a computing node including at least one processor and at least one memory device, the apparatus comprising:

a processor for issuing a command and passing the command to a stream prefetch engine and a list prefetch engine; and the stream prefetch engine and the list prefetch engine for prefetching data to be needed in subsequent clock cycles in the processor in response to the passed command, wherein the stream prefetch engine is configured to:

determine a slowest data or instruction stream and a fastest data or instruction stream, based on speeds of data or instruction streams processed by the processor;

decrease a prefetching depth of the slowest data or instruction stream, the prefetching depth referring to a specific amount of data or instructions to be prefetched; and increase the prefetching depth of the fastest data or instruction stream by the decreased prefetching depth of the slowest data or instruction stream.

15. The apparatus according to claim 14, further comprising:

a look-up engine for determining whether data requested in the command has been prefetched.

16. The apparatus according to claim 15, wherein the look-up engine comprises:

a comparator for comparing an address in the command and addresses for which prefetch requests have been issued.

17. The apparatus according to claim 15, wherein the stream prefetch engine issues a load command for the requested data to a memory system in response to determining that the requested data has not been prefetched.

18. The apparatus according to claim 14, wherein the stream prefetch engine and the list prefetch engine work simultaneously.

19. The apparatus according to claim 14, wherein the stream prefetch engine and the list prefetch engine determines whether the data to be needed in subsequent clock cycles can be identified and prefetched.

20. The apparatus according to claim 19, wherein the stream prefetch engine establishes a new stream and prefetches data in the new stream or prefetches additional data in an existing stream in response to determining that the data to be needed can be identified and prefetched.

21. The apparatus according to claim 19, wherein the list prefetch engine detects a match between an address in the command and an earlier cache miss address in a list and prefetches data in subsequent cache miss addresses in the list in response to determining that the data to be needed can be identified and prefetched.

22. The apparatus according to claim 14, wherein the parallel computing system includes at least four list prefetch engines.

23. The apparatus according to claim 14, wherein if one of the engines fails to prefetch the data to be needed, another engine succeeds to prefetch the data to be needed.

24. The apparatus according to claim 14, wherein data prefetched by the stream prefetch engine and data prefetched by the at least one list prefetch engine are stored in an array or buffer without a distinction.

* * * * *